United States Patent Office 3,632,605
Patented Jan. 4, 1972

3,632,605
PYRROLINE DERIVATIVES
Francois Debarre, Antony, and Gilbert Poiget, Thiais, France, assignors to Rhone-Poulenc S.A., Paris, France
No Drawing. Filed July 13, 1967, Ser. No. 653,006
Claims priority, application France, July 21, 1966, 70,348; May 26, 1967, 108,081
Int. Cl. C07d 27/14
U.S. Cl. 260—326.5         7 Claims

ABSTRACT OF THE DISCLOSURE

Pyrroline derivatives of the formula:

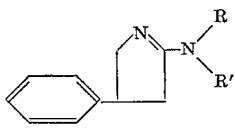

wherein R and R' are the same or different and each represents a hydrogen atom or an alkyl group containing 1 to 5 carbon atoms (preferably methyl), and the benzene ring is unsubstituted or carries one or more substituents selected from halogen atoms, alkyl and alkoxy groups containing 1 to 5 carbon atoms, and hydroxy, nitro and amino groups, and their acid addition salts, possess pharmacodynamic properties. They act on the central nervous system, and are especially useful as anti-depressants; furthermore, they show a hypertensive effect.

---

This invention relates to new therapeutically active pyrroline derivatives and acid addition salts thereof, to processes for their preparation and pharmaceutical compositions containing them.

According to the present invention, there are provided the new pyrroline derivatives of the formula:

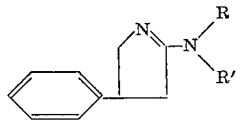

wherein R and R' are the same or different and each represents a hydrogen atom or an alkyl group containing 1 to 5 carbon atoms (preferably methyl), and the benzene ring is unsubstituted or carries one or more substituents selected from halogen atoms, alkyl and alkoxy groups containing 1 to 5 carbon atoms, and hydroxy, nitro and amino groups, and their acid addition salts.

The aforesaid pyrroline compounds possess interesting pharmacodynamic properties. They are active on the central nervous system, and are especially useful as antidepressants; furthermore, they show a hypertensive effect. The pyrroline derivatives have given very interesting results in animal experiments at doses of 0.1 to 20 mg./kg. of animal weight when administered orally and at doses of 0.5 to 5 mg./kg. when administered intravenously. Preferred compounds are those in which R and R' represent hydrogen atoms, and the benzene ring is unsubstitued or carries one to three substituents selected from halogen atoms, and alkoxy, nitro and amino groups and, more especially, those in which the benzene ring is unsubstituted or carries one to three substituents selected from chlorine, methoxy, nitro and amino. The most outstanding compounds are 2 - amino-4-(4-methoxyphenyl)-1-pyrroline, 2-amino-4-phenyl-1-pyrroline and 2-amino-4-(4-aminophenyl)-1-pyrroline, and acid addition salts thereof.

According to a feature of the present invention, the pyrroline derivatives of Formula I, except those wherein the benzene ring carries an amino substituent, are prepared by the reaction of ammonia or an amine of the formula:

wherein R and R' are as hereinfore defined, with a pyrroline derivative of the general formula:

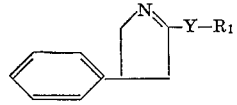

wherein Y represents an oxygen or sulphur atom and $R_1$ represents an alkyl group containing 1 to 3 carbon atoms, and the benzene ring is unsubstituted or substituted as mentioned above in respect of Formula I except that it carries no amino substituent. The reaction is preferably effected by heating the reactants to a temperature within the range of from 50° to 150° C. in the absence or presence of an inert organic solvent such as an alcohol (e.g. ethanol) or an amide (e.g. dimethylformamide).

The reactant of Formula II may be used in the form of the base or in the form of a salt (ammonium salt, e.g. ammonium acetate, or amine addition salt with a weak acid, e.g. an acetate).

The pyrroline derivatives of Formula III in which Y represents a sulphur atom employed as starting material may be obtained by the reaction of a reactive ester of the formula $R_1$–Z, wherein $R_1$ is as hereinbefore defined and Z represents the acid residue of a reactive ester such as a halogen atom or a sulphuric or sulphonic ester residue, with a pyrrolidine derivative of the formula:

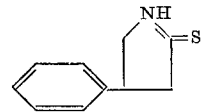

the benzene ring being unsubstituted or carrying one or more substituents selected from halogen atoms, alkyl and alkoxy groups containing 1 to 5 carbon atoms, and hydroxy and nitro groups. The reaction is effected by addition of the reactive ester of formula $R_1$–Z to a solution or suspension of the pyrrolidine-thione of Formula IV in an inert organic solvent, for example dioxan or methylene chloride, at a temperature between 10° and 50° C.

The pyrrolidine derivatives of Formula IV may be obtained by the reaction of phosphorus pentasulphide ($P_2S_5$) with a pyrrolidin-2-one of the formula:

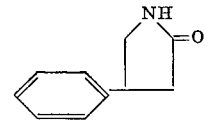

wherein the benzene ring is unsubstituted or substituted as mentioned above in respect of Formula IV. The reaction is carried out by heating the reactants in an inert organic solvent, e.g. pyridine, at the boiling point of the solvent.

The pyrroline derivatives of Formula III in which Y represents an oxygen atom employed as starting material may be obtained by the reaction of triethyloxonium borofluoride [$(C_2H_5)_3O^+BF_4^-$] in the case wherein $R_1$ represents the ethyl radical, or by reaction of a reactive ester of the formula $R_1$–Z with a pyrrolidinone of Formula V. The reaction may generally be effected at a temperature between 10° and 50° C. in an inert organic solvent, for example dioxan or methylene chloride.

According to another feature of the invention, the pyrroline derivatives of Formula I, except those wherein the benzene ring carries an amino substituent, are prepared by the reaction of ammonia or an amine of Formula II with a complex of the formula:

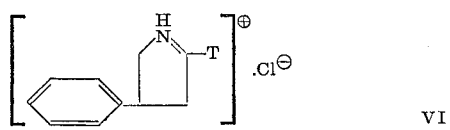

where T represents a group —OPOCl₂, —OCOCl or —OSOCl, and the benzene ring is unsubstituted or substituted by one or more substituents selected from halogen atoms, alkyl and alkoxy groups containing 1 to 5 carbon atoms, and hydroxy and nitro groups. The reaction is advantageously carried out at a temperature between 20° and 80° C. in the absence or presence of an inert organic solvent, for example ethanol.

The complexes of Formula VI can be obtained by the reaction of phosphorus oxychloride, phosgene or thionyl chloride with a pyrrolidinone of Formula V. The reaction is carried out at a temperature between 20° and 50° C. in the presence of an inert organic solvent such as chloroform or benzene.

According to a further feature of the invention, the pyrroline derivatives of Formula I wherein the benzene ring carries one or more amino substituents are prepared by the reduction of corresponding nitro compounds by methods known per se for the reduction of a nitro group to a primary amino group. Advantageously the reduction is effected by means of hydrogen in the presence of a catalyst such as Adams' platinum.

By the term "methods known per se" as used in this specification and accompanying claims is meant methods heretofore used or described in the chemical literature.

The new pyrroline derivatives of Formula I obtained according to the foregoing processes may be purified by physical methods such as distillation, crystallisation or chromatography, or by chemical methods such as the formation of salts, crystallisation of the salts and decomposition of them in an alkaline medium. In the said chemical method, the nature of the anion of the salt is immaterial, the only requirement being that the salt must be well-defined and readily crystallisable.

The new pyrroline derivatives may be converted in manner known per se into acid addition salts. The acid salts may be obtained by the action of acids on the pyrroline derivatives in appropriate solvents such as alcohols, ethers, ketones or chlorinated hydrocarbons. The salt which is formed is precipitated, if necessary after concentration of its solution, and is separated by filtration or decantation.

For therapeutic purposes the pyrroline bases of Formula I are employed as such or in the form of non-toxic acid addition salts, i.e. salts containing anions which are relatively innocuous to the animal organism in therapeutic doses of the salts (such as hydrochlorides and other hydrohalides, sulphates, nitrates, phosphates, acetates, propionates, succinates, benzoates, fumarates, maleates, theophyllinacetates, salicylates, phenolphthalinates and methylene bis-β-hydroxynaphthoates) so that the beneficial physiological properties inherent in the bases are not vitiated by side-effects ascribable to the anions.

The following examples illustrate the preparation of pyrroline derivatives of the present invention.

EXAMPLE 1

A solution of 2-methylthio-4-phenyl-1-pyrroline (2 g.) in 3 N ammoniacal ethanol (80 cc.) is heated at 100 ° C. for 3 hours. The mixture is cooled to ambient temperature and the solvent then evaporated under reduced pressure (20 mm. Hg). The brown residue, which is partially crystalline, is taken up in benzene (60 cc.) and the resulting solution is treated with decolourising charcoal (0.4 g.). The solvent is evaporated under reduced pressure (20 mm. Hg). A beige crystalline residue is obtained, which is suspended in diisopropyl ether (10 cc.). The product is filtered off and successively washed with diisopropyl ether (2×5 cc.) and then with diethyl ether (10 cc.). After drying, 2-amino-4-phenyl-1-pyrroline (0.71 g.), melting at 114–115° C., is obtained. The hydrochloride, prepared in a mixture of ethanol and diethyl ether, melts at 185° C.

2-methylthio-4-phenyl-1-pyrroline used as the starting material is prepared in the following manner:

A solution of 4-phenylpyrrolidin-2-one (96.7 g.) [prepared according to C. F. Koelsch and C. H. Stratton, J. Am. Chem. Soc. 66, 1883 (1944)] and phosphorus pentasulphide (66.4 g.) in pyridine (390 cc.) is heated at the boiling point for 10 minutes. The resulting brown-green solution is cooled to ambient temperature and poured into water (4 litres). The mixture is stirred for 1 hour, and the precipitate is filtered off and washed with water. After drying, a crude product (117 g.) is obtained and this is dissolved in a boiling mixture of benzene (1750 cc.) and cyclohexane (1170 cc.). The solution is treated with decolourising charcoal (15 g.), filtered and cooled; the pale yellow crystals which form are filtered off and washed with a mixture of benzene and cyclohexane (3× 50 cc.). After drying, 4-phenylpyrrolidine-2-thione (49.3 g.), melting at 111° C., is obtained. A second batch weighing 17.4 g. and melting at 113° C. is isolated by concentration of the mother liquors.

14.6 g. of this intermediate product are suspended in dioxan (14.6 cc.). Dimethyl sulphate (7.8 g.) is added dropwise at such a rate as to maintain the temperature between 30° and 40° C. The resulting solution is cooled by ice water, and water (145 cc.) is added. A yellow precipitate is filtered off and a solution of potassium hydroxide (5.46 g.) in water (27.3 cc.) is added to the filtrate, cooled to 5° C. The supernatant oil is extracted with diisopropyl ether (2× 75 cc.), and the aqueous layer is saturated with potassium carbonate and again extracted with diisopropyl ether (75 cc.). The organic extracts are combined and dried over sodium sulphate. The solvent is evaporated under reduced pressure (20 mm. Hg) and the residual oil is then distilled under 0.5 mm. Hg. 2-methylthio-4-phenyl-1-pyrroline (11.15 g.), boiling at 111° C., is thus obtained.

EXAMPLE 2

A solution of 2-ethoxy-4-phenyl-1-pyrroline (5 g.) in 2.5 N ammoniacal ethanol (120 cc.) is heated at 100° C. for 2 hours. The mixture is cooled to ambient temperature and the yellowish solution then treated with decolourising charcoal (0.3 g.). The solvent is evaporated under reduced pressure (20 mm. Hg). The practically colourless crystalline residue, weighing 5.1 g., is recrystallised from ethyl acetate (12 cc.). After drying, 2-amino-4-phenyl-1-pyrroline (1.56 g.), metling at 117° C., is obtained.

2 - ethoxy - 4 - phenyl-1-pyrroline used as the starting material is prepared in the following manner:

A solution of triethyloxonium borofluoride (93.4 g.) in methylene chloride (200 cc.) is added over a period of 30 minutes to a solution of 4-phenylpyrrolidin-2-one (79.2 g.) in methylene chloride (650 cc.). The temperature of the medium rises from 22° to 29° C. The resulting pale yellow solution is left at ambient temperature for 15 hours. It is cooled by means of ice water and a 55% aqueous potassium carbonate solution (158 g.) is added dropwise. The precipitate is filtered off and washed with methylene chloride (250 cc.). The filtrate is dried over anhydrous potassium carbonate and the solvent then evaporated under 30 mm. Hg. The residual oil is distilled under 1.5 mm. Hg and 2-ethoxy-4-phenyl-1-pyrroline (71.9 g.), boiling between 108° and 111° C., is obtained.

The triethyloxonium borofluoride is prepared according to H. Meerwein et coll [J. Prakt. Chem., 147, 257 (1937)].

EXAMPLE 3

A solution of 2-ethoxy-4-phenyl-1-pyrroline (10 g.) in a 4 N ethanolic solution of methylamine (175 cc.) is heated at 100° C. for 2 hours. By proceeding as described in Example 2, 2-methylamino-4-phenyl-1-pyrroline (5.65 g.), melting at 102° C., is obtained. The hydrochloride, prepared in a mixture of ethanol and diethyl ether, melts at 186° C.

EXAMPLE 4

A solution of 2-ethoxy-4-(4-methoxyphenyl)-1-pyrroline (25.0 g.) in 3.9 N ammoniacal ethanol (295 cc.) is heated at 100° C. for 2 hours. The mixture is cooled to ambient temperature and the solvent then evaporated under reduced pressure (20 mm. Hg). The practically colourless crystalline residue, weighing 29.0 g., is recrystallised from acetonitrile (280 cc.). After drying, 2-amino-4-(4-methoxyphenyl)-1-pyrroline (16.5 g.), melting at 175° C., is obtained.

The 2-ethoxy-4(4-methoxyphenyl)-1-pyrroline used as the starting material is prepared in the following manner:

Starting with 4-(4-methoxyphenyl)pyrrolidin-2-one (40.0 g.) and triethyloxonium borofluoride (48.3 g.) dissolved in methylene chloride, 2-ethoxy-4-(4-methoxyphenyl)-1-pyrroline (39.6 g.) is obtained in the form of a colourless oil boiling between 121° and 126° C. under reduced pressure 0.6 mm. Hg).

4-(4-methoxyphenyl)pyrrolidin-2-one is prepared according to V. V. Perekalin and M. M. Zobacheva [J. Gen. Chem., U.S.S.R. 29, 2865 (1959)].

EXAMPLE 5

A solution of 2-ethoxy-4-(3,4-dimethoxyphenyl)-1-pyrroline (20.0 g.) in 2.5 N ammoniacal ethanol (400 cc.) is heated at 100° C. for 2 hours. The mixture is cooled to ambient temperature, and the solvent then evaporated under reduced pressure 20 mm. Hg). A pink solid (21.7 g.), melting at 155–160° C., is obtained. This is recrystallised from acetonitrile (86 cc.). After drying, colourless crystals (10.0 g.) of 2-amino-4-(3,4-dimethoxyphenyl)-1-pyrroline, melting at 165° C., are obtained. The hydrochloride prepared in a mixture of ethanol and diethyl ether melts between 252° and 254° C.

2-ethoxy-4-(3,4-dimethoxyphenyl)-1-pyrroline used as the starting material is prepared in the following manner:

2-ethoxy-4-(3,4-dimethoxyphenyl)-1-pyrroline (40.6 g.), B.P. 124–141° C./0.2 mm. Hg, is obtained by the reaction of triethyloxonium borofluoride (43.3 g.) with 4-(3,4-dimethoxyphenyl)pyrrolidin-2-one (50.4 g.) in methylene chloride.

4-(3,4-dimethoxyphenyl)pyrrolidin-2-one (60.4 g.) M.P. 123–124° C., is obtained by decarboxylating 3-carboxy-4-(3,4-dimethoxyphenyl)pyrrolidin-2-one (79.4 g.) at 200° C.

3-carboxy-4-(3,4-dimethoxyphenyl)pyrrolidin-2-one (92.5 g.), M.P. 140° C. with decomposition, is obtained by saponifying 3-methoxycarbonyl-4-(3,4-dimethoxyphenyl)pyrrolidin-2-one (103.2 g.) with aqueous potassium hydroxide solution.

3-methoxycarbonyl-4-(3,4-dimethoxyphenyl)pyrrolidin-2-one 55.6 g.), M.P. 156–158° C., is obtained by hydrogenating a methanolic solution of methyl 2-methoxycarbonyl-3-(3,4-dimethoxyphenyl)-4-nitrobutyrate (104.5 g.) at 50° C. and under 20 bars pressure, in the presence of Raney nickel (20.0 g.).

Methyl 2-methoxycarbonyl-3-(3,4-dimethoxyphenyl)-4-nitrobutyrate (27.9 g.) M.P. 107–109° C., is obtained by condensing methyl malonate 13.2 g.) with 1-nitro-2-(3,4-dimethoxyphenyl)ethylene (20.9 g.) in methanol in the presence of sodium methylate 5.4 g.).

The initial 1-nitro-2-(3,4-dimethoxyphenyl)ethylene is prepared according to C. B. Gairaud and G. R. Lappin [J. Org. Chem. 18, 2 (1953)].

EXAMPLE 6

A solution of 2-ethoxy-4-(3,4,5-trimethoxyphenyl)-1-pyrroline (15.0 g.) in 2.5 N ammoniacal ethanol (300 cc.) is heated at 100° C. for 2 hours. The mixture is cooled, the solvent is evaporated under reduced pressure, and a solid residue weighing 15.0 g. is obtained, which is recrystallised from acetonitrile (30 cc.). 2-amino-4-(3,4,5-trimethoxyphenyl)-1-pyrroline (6.7 g.) so obtained melts at 192–194° C. The hydrochloride, prepared in a mixture of ethanol and diethyl ether, melts at 228–230° C.

2-ethoxy-4-(3,4,5-trimethoxyphenyl)-1-pyrroline used as the starting material is prepared in the following manner:

2-ethoxy-4-(3,4,5-trimethoxyphenyl)-1-pyrroline (39.4 g.), B.P. 148–150° C./0.4 mm. Hg, is obtained by the reaction of triethyloxonium borofluoride 36.9 g.) with 4-(3,4,5-trimethoxyphenyl)pyrrolidin-2-one 48.9 g.) in methylene chloride.

4-(3,4,5-trimethoxyphenyl)pyrrolidin-2-one (49.6 g.), M.P. 135–136° C., is obtained by decarboxylating 3-carboxy-4-(3,4,5-trimethoxyphenyl)pyrrolidin-2-one (80.5 g.) at 185° C.

3-carboxy-4-(3,4,5-trimethoxyphenyl)pyrrolidin-2-one (81.4 g.), M.P. 175–177° C. with decomposition, is obtained by saponifying 3-methoxycarbonyl-4-(3,4,5-trimethoxyphenyl)pyrrolidin-2-one (90.2 g.) with aqueous potassium hydroxide solution.

3-methoxycarbonyl-4-(3,4,5-trimethoxyphenyl)pyrrolidin-2-one (91.2 g.), M.P. 128–130° C. and then 166–170° C., is obtained by hydrogenating a methanolic solution of methyl 2-methoxycarbonyl-3-(3,4,5-trimethoxyphenyl)-4-nitrobutyrate (130.0 g.) at 50° C. under 20 bars pressure, in the presence of Raney nickel.

Methyl 2-methoxycarbonyl-3-(3,4,5-trimethoxyphenyl)-4-nitrobutyrate (130.3 g.), M.P. 120–123° C., is obtained by condensing methyl malonate (55.5 g.) with 1-nitro-2-(3,4,5-trimethoxyphenyl)ethylene (100.5 g.) in methanol in the presence of sodium methylate (2.27 g.).

The initial 1-nitro-2-(3,4,5-trimethoxyphenyl)ethylene is prepared according to K. H. Slotta and G. Szyszka [J. Prakt. Chem. 137, 344 (1933)].

EXAMPLE 7

A mixture of 2-ethoxy-4-(2,6-dichlorophenyl)-1-pyrroline (6.3 g.) and ammonium acetate (3.7 g.) suspended in dimethylforamide (6.3 cc.) is heated at 110° C. for 7 minutes. The mixture is cooled to ambient temperature and the resulting yellow-orange solution is taken up in water (6.3 cc.). A slight amount of insoluble water is filtered off and the filtrate is then made alkaline by addition of 40% sodium hydroxide solution (5 cc.). The precipitate is filtered off and then washed three times with water (total 15 cc.). After drying, 2-amino-4-(2,6-dichlorophenyl)-1-pyrroline (4.84 g.), melting at between 156 and 158° C., is obtained.

This crude product is suspended in water (24.2 cc.) and glacial acetic acid (2.4 cc.) is then added, and a slight amount of insoluble matter is filtered off. The filtrate is made alkaline by addition of 40% sodium hydroxide solution (4.06 cc.), and the precipitate is then filtered off and washed three times with water (total 15 cc.). After drying, the purified base (4.52 g.), melting at 155–156° C., is obtained and this is recrystallised from acetonitrile (47.8 cc.) to give 2-amino-4-(2,6-dichlorophenyl)-1-pyrroline (4.09 g.) melting at 164–165° C. The hydrochloride, prepared in a mixture of ethanol and diethyl ether, melts at 235° C.

2-ethoxy-4-(2,6-dichlorophenyl)-1-pyrroline used as the starting material is prepared in the following manner:

2-ethoxy-4-(2,6-dichlorophenyl)-1-pyrroline (23.9 g.), B.P. 119–122° C./0.5 mm. Hg, is obtained by the reaction of triethyloxonium borofluoride (26.4 g.) with 4-(2,6-dichlorophenyly)pyrrolidin-2-one (31.3 g.) in methylene chloride.

4-(2,6-dichlorophenyl)pyrrolidin-2-one (40.7 g.), M.P. 166–168° C., is obtained by decarboxylating 3-carboxy-4-(2,6-dichlorophenyl)pyrrolidin-2-one (68.3 g.) at 190° C.

3-carboxy-4-(2,6-dichlorophenyl)pyrrolidin-2-one (68.3 g.), M.P. 180–190° C. with decomposition, is obtained by saponifying 3 - methoxycarbonyl-4-(2,6-dichlorophenyl)-pyrrolidin-2-one (67.5 g.) with aqueous potassium hydroxide solution.

3 - methoxycarbonyl - 4 - (2,6 - dichlorophenyl)pyrrolidin-2-one (67.5 g.), M.P. 176–178° C., is obtained by hydrogenating a methanolic solution of methyl 2-methoxycarbonyl - 3 - (2,6-dichlorophenyl)-4-nitrobutyrate (100.0 g.) at 50° C. under 20 bars pressure.

Methyl 2 - methoxycarbonyl-3-(2,6-dichlorophenyl)-4-nitrobutyrate (216.0 g.), M.P. 90° C., is obtained by condensing methyl malonate (93.7 g.) with 1-nitro-2-(2,6-dichlorophenyl)ethylene (154.8 g.) in methanol in the presence of sodium methylate (3.8 g.).

1-nitro-2-(2,6-dichlorophenyl)ethylene (156.0 g.), M.P. 63–64° C., is obtained by condensing 2,6-dichlorobenzaldehyde (175.0 g.) and nitromethane (188.0 g.) in boiling acetic acid in the presence of ammonium acetate (66.5 g.).

EXAMPLE 8

A mixture of 2-ethoxy-4-(4-nitrophenyl)-1-pyrroline (18.6 g.) and ammonium acetate (24.6 g.) is heated at 90° C. for 6 minutes. The resulting solid mass is cooled to ambient temperature, taken up in water (240 cc.), and a slight amount of insoluble matter is then filtered off. The filtrate is made alkaline by addition of 40% sodium hydroxide solution (40 cc.). The crystals present are filtered off and then washed three times with water (total 60 cc.). After drying, 2-amino-4-(4-nitrophenyl)-1-pyrroline (14.7 g.) is obtained in the form of a beige solid, which melts between 148° and 150° C. with decomposition. The hydrochloride, prepared in a mixture of ethanol and diethyl ether, melts at 263–264° C.

2-ethoxy-4-(4-nitrophenyl)-1-pyrroline used as the starting material is prepared in the following manner:

2-ethoxy-4-(4-nitrophenyl)-1-pyrroline (36.9 g.), M.P. 125–126° C., is obtained by reacting triethyloxonium borofluoride (26.8 g.) with 4-(4-nitrophenyl)pyrrolidin-2-one (29.1 g.) in methylene chloride.

4 - (4 - nitrophenyl)pyrrolidin-2-one (29.1 g.), M.P. 175° C., is obtained by nitration of 4-phenylpyrrolidin-2-one (40.0 g.) in concentrated sulphuric acid, at 5–10° C., with a mixture of nitric acid (d=1.49; 17.4g.) and sulphuric acid (d=1.83; 17.4 g.).

EXAMPLE 9

A solution of 2-amino-4-(4-nitrophenyl)-1-pyrroline (14.65 g.), prepared according to the procedure described in Example 8, in methanol (732 cc.) to which 6.3 N ethanolic hydrochloric acid (23.8 cc.) and previously reduced Adams platinum (1.43 g.) have been added is stirred under an atmosphere of hydrogen (pressure of 1 bar). The absorption of hydrogen ceases after 1 hour 30 minutes stirring. The catalyst is filtered off and then washed with ethanol. The solvent is evaporated under reduced pressure (30 mm. Hg), and the oily residue is taken up in boiling ethanol (108 cc.). The solution is kept in a refrigerator for 3 hours and the colourless crystals are then filtered off and washed twice with ethanol (total 20 cc.). 2-amino-4-(4-aminophenyl)pyrroline dihydrochloride (13.8 g.), melting at about 223–225° C. with decomposition, is thus obtained.

This product (14.7 g.) is dissolved in boiling ethanol (147 cc.) and the resulting solution is then treated with decolourising charcoal (0.7 g.), filtered and diethyl ether (160 cc.) added to the filtrate. The mixture is kept in a refrigerator for 3 hours, and the crystals obtained are then filtered off and washed three times with a 1:1 mixture (total 45 cc.) of ethanol and diethyl ether. After drying, 2-amino-4-(4-aminophenyl)-1 - pyrroline dihydrochloride (13.2 g.), melting at about 213–215° C. with decomposition, is obtained. This product is solvated by about 6% of ethanol.

EXAMPLE 10

A solution of phosgene (3.96 g.) in chloroform (10 cc.) is added over a period of 1 hour to a solution of 4-(4-methoxyphenyl)-pyrrolidin-2-one (3.82 g.) in chloroform (23 cc.). The temperature rises from 20° C. to 24° C. The resulting solution is stirred at ambient temperature for 16 hours, and then the solvent is evaporated at 25° C. under reduced pressure (20 mm. Hg). 3.2 N ammoniacal ethanol (25 cc.) is added to the pink syrupy concentrate. An abundant precipitate forms whilst the temperature rises to 55° C. The mixture is heated and maintained at the boil for 4 hours 30 minutes and is then cooled to ambient temperature. The ammonium chloride precipitate is filtered off and washed with ethanol (10 cc.). The filtrate is evaporated to dryness at 50° C. under reduced pressure (30 mm. Hg). The pasty whitish residue is taken up in water (10 cc.) and a slight amount of insoluble material (initial product) is filtered off. 40% sodium hydroxide solution (2 cc.) is added to the filtrate, and the oily precipitate is extracted twice with chloroform (total 80 cc.). The organic extracts are combined, washed with water (15 cc.), dried over potassium carbonate, and the solvent evaporated under reduced pressure (30 mm. Hg). The residue is dissolved in boiling acetonitrile (20 cc.) and the hot solution is filtered. On cooling, colourless platelets are obtained and these are filtered off and washed three times with acetonitrile (total 6 cc.) to give, after drying, 2-amino-4-(4-methoxyphenyl)-1-pyrroline (1.1 g.) melting at 175–176° C.

EXAMPLE 11

A solution of phosphorus oxychloride (4.60 g.) in benzene (25 cc.) is added to a suspension of 4-(4-methoxyphenyl)pyrrolidin-2-one (5.73 g.) in benzene (23 cc.) over a period of 25 minutes. The temperature remains at about 22° C. The mixture is stirred and, after 35 minutes, dissolution is completed and the temperature reaches 26° C. After further stirring at ambient temperature for 4 hours, the solvent is evaporated at 30° C. under reduced pressure (30 mm. Hg). 3.2 N ammoniacal ethanol (50 cc.) is added to the orange coloured syrupy residue over a period of 2 minutes. An abundant white precipitate forms whilst the temperature rises to 55° C. The mixture is left at ambient temperature for 16 hours and then heated at the boiling point for 5 hours. The solvent is then evaporated at 40° C. under reduced pressure (30 mm. Hg). The residue is taken up in water (50 cc.) and the insoluble material then extracted with methylene chloride (20 cc.). The aqueous solution is made alkaline by addition of 40% sodium hydroxide solution (20 cc.). The oily precipitate is extracted three times with methylene chloride (total 100 cc.). The organic extracts are combined and then washed with water (20 cc.) and dried over potassium carbonate. The solvent is evaporated under reduced pressure (30 mm. Hg), and the whitish oily residue is dissolved in boiling acetonitrile (6.4 cc.). On cooling, colourless platelets are obtained and these are filtered off and washed three times with acetonitrile (total 2 cc.) to give, after drying, 2-amino-(4-methoxyphenyl)-1-pyrroline (0.5 g.) melting at 174–175° C.

EXAMPLE 12

A solution of 2-ethoxy-4-phenyl-1-pyrroline (10 g.) and dimethylamine (31.5 g.) in ethanol (175 cc.) is heated at 100° C. for 2 hours. After cooling to ambient temperature and evaporating the solvent under reduced pressure (30 mm. Hg), crude 2-dimethylamino-4-phenyl-1-pyrroline is obtained in the form of a mobile yellow-orange oil. The acid fumarate (1.5 mol of fumaric acid per mole of base), prepared in ethanol, melts at 158° C.

EXAMPLE 13

A solution of 2-ethoxy-4-(4-chlorophenyl)-1-pyrroline (11.5 g.) and ammonium acetate (7.9 g.) in dimethylformamide (11.5 cc.) is heated at 110° C. for 15 minutes. The resulting pink solution is cooled to ambient temperature. Water (23 cc.) is added and the mixture then made alkaline by addition of 10 N sodium hydroxide solution (10.3 cc.). The colourless crystals which appear are filtered off and then washed three times with water (total 15 cc.). After drying, 2-amino-4-(4-chlorophenyl)-1-pyrroline (10 g.), melting at 130° C., is obtained. The hydrochloride, prepared in a mixture of ethanol and diethyl ether, melts at 250° C.

2-ethoxy-4-(4-chlorophenyl)-1-pyrroline used as the starting material is prepared in the following manner:

2-ethoxy-4-(4-chlorophenyl)-1-pyrroline (25.3 g.), B.P. 108–112° C./0.5 mm. Hg, is obtained by the reaction of triethyloxonium borofluoride (26.6 g.) with 4-(4-chlorophenyl)pyrrolidin-2-one (27.4 g.) in methylene chloride.

4-(4-chlorophenyl)pyrrolidin-2-one (27.4 g.), M.P. 118° C., is obtained by diazotisation of 4-(4-aminophenyl)pyrrolidin-2-one (34 g.) with sodium nitrite (14.6 g.) in hydrochloric acid followed by the reaction of the diazonium chloride solution obtained with cuprous chloride.

4-(4-aminophenyl)pyrrolidin-2-one (14.7 g.), M.P. 148–150° C., is obtained by hydrogenating 4-(4-nitrophenyl)pyrrolidin-2-one (22.6 g.) [prepared as described in Example 8] at 1 bar pressure and ordinary temperature in the presence of Adams' platinum.

The present invention further includes within its scope pharmaceutical compositions which comprise a pyrroline derivative of Formula I, or non-toxic acid addition salt thereof, in association with a pharmaceutical carrier or coating. The invention includes especially such preparations made up for oral, parenteral or rectal administration, or topical applications, e.g. as ointments or creams.

Solid compositions for oral administration include tablets, pills, powders and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatising agents. The compositions according to the invention, for oral application, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or suppository wax.

The percentage of active ingredient in the compositions of the invention may be varied, it being necessary that it should constitute a proportion such that a suitable dosage shall be obtained. The dosage depends on the desired therapeutic effect, on the route of administration and on the duration of treatment. The dosages are generally between 0.1 and 5 mg. of active substance per day for an adult.

The following examples illustrate pharmaceutical compositions according to the invention.

EXAMPLE 14

Tablets weighing 150 mg. and having the following composition are prepared by the usual technique:

|  | Mg. |
|---|---|
| 2-amino-4-phenyl-1-pyrroline | 0.1 |
| Starch | 110 |
| Colloidal silica | 37 |
| Magnesium stearate | 2.9 |

EXAMPLE 15

Tablets weighing 150 mg. and having the following composition are prepared by the usual technique:

|  | Mg. |
|---|---|
| 2-amino-4-phenyl-1-pyrroline | 2.5 |
| Starch | 110 |
| Colloidal silica | 35 |
| Magnesium stearate | 2.5 |

We claim:
1. A compound of the formula:

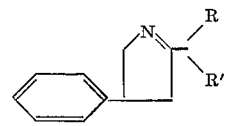

wherein R and R' each represent hydrogen or alkyl of 1 through 5 carbon atoms, and the benzene ring is unsubstituted or carries one through three substituents selected from the class consisting of halogen, alkyl and alkoxy of 1 through 5 carbon atoms, hydroxy, nitro and amino, and its non-toxic acid addition salts.

2. A compound according to claim 1 wherein R and R' each represent hydrogen or methyl.

3. A compound according to claim 1 wherein R and R' each represent hydrogen and the benzene ring is unsubstituted or carries one through three substituents selected from the class consisting of halogen, alkoxy of 1 through 5 carbon atoms, nitro and amino.

4. A compound according to claim 1 wherein R and R' each represent hydrogen and the benzene ring is unsubstituted or carries one through three substituents selected from the class consisting of chlorine, methoxy, nitro and amino.

5. 2-amino-4-(4-methoxyphenyl)-1-pyrroline and its non-toxic acid addition salts.

6. 2-amino-4-phenyl-1-pyrroline and its non-toxic acid addition salts.

7. 2-amino-4-(4-aminophenyl)-1-pyrroline and its non-toxic acid addition salts.

References Cited

UNITED STATES PATENTS 2,975,189   3/1961   Bortnick et al. __ 260—326.5 XR

NICHOLAS S. RIZZO, Primary Examiner

J. A. NARCAVAGE, Assistant Examiner

U.S. Cl. X.R.

260—253, 326.3, 326.5 FL, 471, 613; 424—274